US007900729B2

(12) United States Patent
Smullen, Jr.

(10) Patent No.: US 7,900,729 B2

(45) Date of Patent: Mar. 8, 2011

(54) HOOD ADJUSTMENT ASSEMBLY

(75) Inventor: Peter R. Smullen, Jr., Aubrey, TX (US)

(73) Assignee: PACCAR Inc, Bellevue, WA (US)

( * ) Notice: Subject to any disclaimer, the term of this patent is extended or adjusted under 35 U.S.C. 154(b) by 368 days.

(21) Appl. No.: 11/752,821

(22) Filed: May 23, 2007

(65) Prior Publication Data

US 2008/0289145 A1 Nov. 27, 2008

(51) Int. Cl.
*B62D 25/10* (2006.01)

(52) U.S. Cl. ...................................... 180/69.24; 180/69.2

(58) Field of Classification Search ................. 180/69.2, 180/69.4; 292/137, 146, 150, 302
See application file for complete search history.

(56) References Cited

U.S. PATENT DOCUMENTS

| | | | | |
|---|---|---|---|---|
| 1,189,969 | A * | 7/1916 | Kimball | 292/174 |
| 1,279,519 | A * | 9/1918 | Davis | 292/137 |
| 1,619,913 | A * | 3/1927 | Baruch | 292/145 |
| 2,027,888 | A | 1/1936 | Solomon | |
| 2,350,297 | A * | 5/1944 | Vesta | 296/152 |
| 2,749,165 | A * | 6/1956 | Coulter | 292/171 |
| 2,753,439 | A * | 7/1956 | Greenfield | 362/549 |
| 4,270,623 | A * | 6/1981 | Brandl et al. | 180/69.2 |
| 5,139,306 | A * | 8/1992 | Ott et al. | 296/198 |
| 5,595,416 | A * | 1/1997 | Horwill | 296/91 |
| 5,881,937 | A * | 3/1999 | Sadler | 224/509 |
| 6,442,801 | B1 * | 9/2002 | Kim | 16/361 |
| 6,508,495 | B1 * | 1/2003 | Riley | 292/152 |
| 6,637,531 | B2 | 10/2003 | Palenchar | |
| 2005/0285493 | A1 * | 12/2005 | Hu et al. | 312/334.4 |

FOREIGN PATENT DOCUMENTS

DE 3309112 A1 9/1984

* cited by examiner

*Primary Examiner* — J. Allen Shriver, II
*Assistant Examiner* — Erez Gurari

(57) ABSTRACT

An adjustment assembly for adjustably coupling a first structural member to a second structural member is provided. The adjustment assembly includes a clamping member adapted to engage a portion of the first structural member and at least one fastener adapted to pass through the clamping member and the first and second structural members. The fastener is moved into a first position to fixedly couple the first structural member to the second structural member, and the fastener is moved into a second position to adjustably couple the first structural member to the second structural member.

15 Claims, 3 Drawing Sheets

HOOD ADJUSTMENT ASSEMBLY

BACKGROUND

Heavy-duty (HD) vehicles, such as Class 8 trucks, are often assembled to accommodate specific customer requirements and requests. Satisfying these requirements and requests normally requires manual assembly of at least some of the components. Reducing the amount of time or labor needed to manually install a particular part results in reduced assembly costs and higher output. Traditionally, installing the hood of an HD vehicle can require two persons and a significant amount of time to properly locate and install the hood on the vehicle frame.

In a typical installation of a hood on an HD vehicle, the hood must be properly located on the vehicle frame such that the hood to cab cowl gap is within predetermined standards. The hood position is normally unique for each vehicle; therefore, an installer must often install the hood several times before the hood is in an appropriate position relative to the cab. This can lead to increased assembly time and lower output.

Additionally, installation of the hood normally requires at least two people. After the hood is properly located on the vehicle frame as described above, a first person must hold the hood in position while a second person retrieves fasteners and secures the hood to the vehicle frame.

It is therefore desired to have an adjustment assembly for adjustably securing the hood to the vehicle, which will result in a reduction in the number of persons required for adjusting the position of the hood and/or installing the hood.

SUMMARY

An adjustment assembly for adjustably coupling a first structural member to a second structural member is provided. The adjustment assembly includes a clamping member adapted to engage a portion of the first structural member and at least one fastener adapted to pass through the clamping member and the first and second structural members. The fastener is moved into a first position to fixedly couple the first structural member to the second structural member, and the fastener is moved into a second position to adjustably couple the first structural member to the second structural member.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
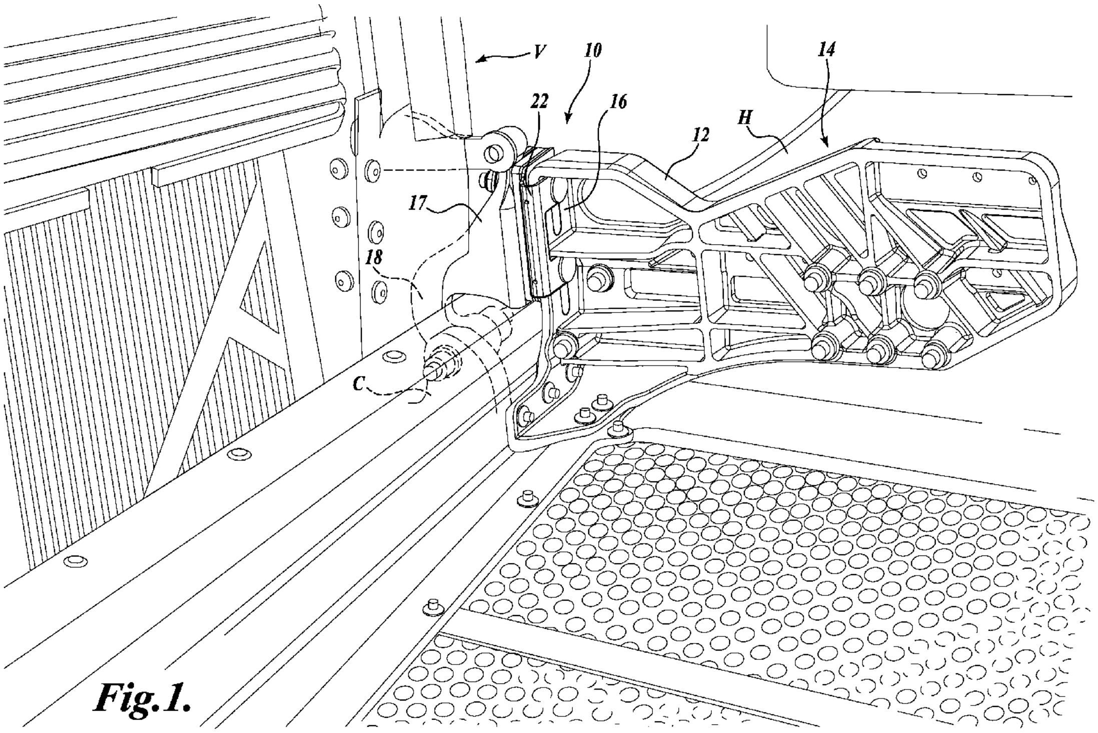
FIG. 1 is an environmental view of one suitable embodiment of an adjustment assembly constructed in accordance with aspects of the present disclosure, wherein the adjustment assembly is shown coupling a first structural member to a second structural member.

One suitable embodiment of an adjustment assembly 10 will now be described with reference to the drawings where like numerals correspond to like elements. Referring to FIG. 1, the adjustment assembly 10 aids an operator when installing a hood H on a vehicle frame, or chassis C. Although the adjustment assembly 10 will be described hereinafter with reference to heavy duty trucks, it will be appreciated that aspects of the adjustment assembly 10 have wide application, and may be suitable for use with other vehicles or machines where adjustable coupling of a first structural member to a second structural member is desired. Accordingly, the following descriptions and illustrations herein should be considered illustrative in nature, and thus, not limiting the scope of the present disclosure.

FIG. 1 illustrates one exemplary embodiment of the adjustment assembly 10 disposed within a heavy duty vehicle V for adjustably coupling the hood H to the chassis C. It is preferred that first and second substantially identical adjustment assemblies 10 are disposed on the right and left sides of the vehicle V for coupling the hood H to the chassis C. However, for clarity, only one adjustment assembly 10 will be hereinafter described. Moreover, it should be appreciated that any preferred hood and chassis design may be used; and therefore, the hood H and chassis C described and illustrated in FIGS. 1-4 should be seen as illustrative only, and should not be taken as limiting the scope of the present disclosure.

The adjustment assembly 10 is coupled to the hood H through a first structural member, or hood bracket 12, which is preferably made of metal or any other sufficiently durable material. The hood bracket 12 includes a hood mounting portion 14 and an adjustment portion 16. The hood mounting portion 14 is suitably formed to mount to the underside of a vehicle hood H in any well-known manner, such as with a plurality of fasteners. However, it should be appreciated that the hood bracket 12 may instead be formed as part of the hood H. In the embodiment shown, the hood mounting portion 14 secures to the interior of the hood H on one side of the hood H. The adjustment portion 16 is suitably formed on the hood bracket 12 such that it extends outwardly in a substantially transverse manner from the interior of the hood to be received within a portion of the adjustment assembly 10 (see also FIG. 2). The adjustment portion 16 may comprise a bottom edge of the hood bracket 12 that is sufficiently wide to engage a portion of the adjustment assembly 10.

The adjustment assembly 10 is coupled to the chassis C through a second structural member, or chassis bracket 17, which is preferably made of metal or any other sufficiently durable material. As can best be seen by referring to FIG. 2, the chassis bracket 17 includes a chassis mounting portion 18 and an adjustment assembly mounting portion 20. The chassis mounting portion 18 is suitably formed to be mounted to the chassis C in any well-known manner (see FIG. 1). It is preferred that the chassis mounting portion 18 be pivotally mounted to the chassis C such that the chassis bracket 17, the hood adjustment assembly 10, and the hood bracket 12 can move with the hood H when the hood is moved between an open and closed position in a manner well-known in the art. The adjustment assembly mounting portion 20 may be substantially flat such that it may easily engage a portion of the adjustment assembly 10 to couple the chassis C to the adjustment assembly 10.

Figure 2:
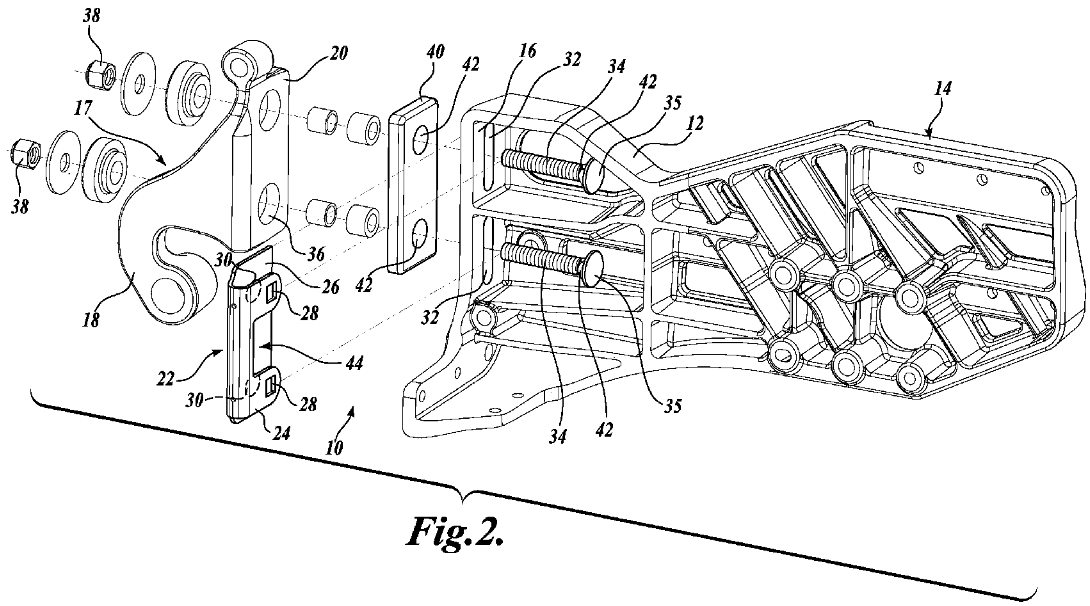
FIG. 2 is an exploded view of the adjustment assembly of FIG. 1.

Referring to FIG. 2, the adjustment assembly 10 will be described in greater detail. As best shown in FIG. 2, the adjustment assembly 10 adjustably couples the hood bracket 12 to the chassis bracket 17 to effectively couple the hood H to the chassis C. The adjustment assembly 10 includes a clamping member 22 that is substantially C shaped in cross section to define an outward retainer portion 24 and an inward retainer portion 26. The clamping member 22 is preferably made of a semi flexible material such that the outward and inward retainer portions 24 and 26 may be moved closer together when a clamping force is applied to the clamping member 22. The clamping member 22 includes at least one outward opening 28 formed in the outward retainer portion 24 and at least one inward opening 30 (shown hidden in FIG. 2) formed in the inward retainer portion 26. In the embodiment shown, the outward and inward openings 28 and 30 are in substantial alignment. Preferably, the outward retaining portion 24 includes two outward openings 28 and the inward retainer portion 26 includes two corresponding inward openings 30.

Figure 3:
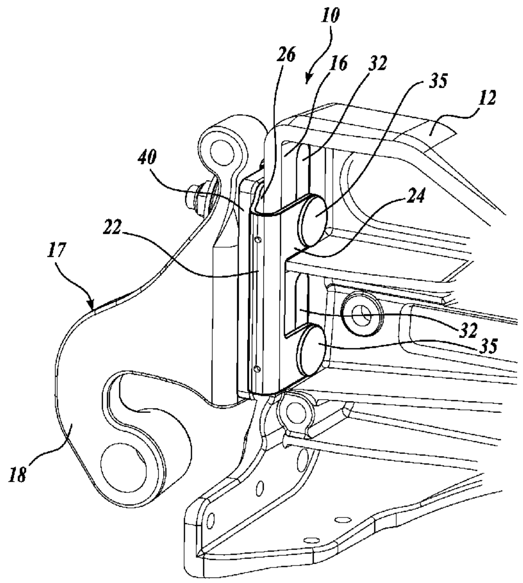
FIG. 3 is an isometric view of the adjustment assembly of FIG. 1, wherein the first structural member is shown in a first position.

Referring to FIGS. 2 and 3, the hood bracket 12 is disposed between the outward and inward retaining portions 24 and 26 of the clamping member 22 to couple the clamping member 22 to the hood bracket 12. If necessary, a section of the outward or inward retaining portions 24 or 26 may be removed to correspond to any structural webbing, flange, etc., formed on the hood bracket 12. As illustrated in the FIGURES, a portion 44 of the outward retaining portion 24 between the outward openings 28 is removed to receive a structural flange of the hood bracket 12 when the clamping member 22 engages the hood bracket 12.

The adjustment portion 16 of the hood bracket 12 includes a plurality of longitudinal slots 32 that align with the outward and inward openings 28 and 30 of the outward and inward retainer portions 24 and 26, respectively, when the clamping member 22 engages the hood bracket 12. The outward and inward openings 28 and 30 formed in the clamping member 22, as well as the longitudinal slots 32 formed in the hood bracket 12, are adapted to receive a suitable fastener 34, such as a bolt, therewithin. The bolts 34 pass through the outward openings 28 of the clamping member 22, the longitudinal slots 32 of the hood bracket 12, and the inward openings 30 of the clamping member 22 to couple the clamping member 22 to the hood bracket 12.

The clamping member 22 is further mounted to the chassis bracket 17 to couple the hood bracket 12 to the chassis bracket 17. The adjustment assembly mounting portion 20 of the chassis bracket 17 is adapted to engage the bottom surface of the inward retainer portion 26 of the clamping member 22. The adjustment assembly mounting portion 20 includes openings 36 that correspond to the inward openings 30 of the clamping member 22. In this manner, the bolts 34 may also pass through the openings 36 in the chassis bracket 17 to further couple the clamping member 22 to the chassis bracket 17. After the bolts 34 pass through the clamping member 22, the hood bracket 12, and the chassis bracket 17, a nut 38 is thereafter received on the end of each bolt to secure the chassis bracket 17 to the hood bracket 12. A washer or other fastening element may also be received on the bolt 34 before the nut 38 is threadingly received thereon.

As the nuts 38 are tightened or loosed on the bolts 34, the bolts 34 remain in a substantially stationary position within the clamping member 22. The outward openings 28 in the outward retainer portion 24 are shaped and sized to receive a square neck portion 42 of the bolt 34. With the square neck portion 42 received within the openings 28, the bolt 34 cannot rotate within the outward openings 28. As a result, the bolts 34 remain substantially stationary as the nuts 38 are threaded onto the bolt 34. The clamping member 22 is also designed such that the outward and inward openings 28 and 30 and the outward and inward retainer portions 24 and 26 align the bolts 34 in a substantially perpendicular position relative to the clamping member 22. The clamping member 22 retains the bolts in a substantially perpendicular arrangement as the hood H is being adjusted, which prevents the bolts 34 from racking and binding the hood H.

If desired, a dampening pad 40 may be disposed between the clamping member 22 and the chassis bracket 17 to reduce the vibrational effects of the chassis C on the hood H. The dampening pad 40 may be made from any suitable elastomeric material, such as rubber. The dampening pad 40 includes a plurality of openings 42 that are substantially aligned with the openings 28, 30, and 36, and are adapted to receive the fastener 34.

Referring to FIG. 3, when mounting and positioning the hood H on the vehicle V, the hood bracket 12 is received within the clamping member 22, and the bolts 34 are passed through the openings 28 and 30 in the clamping member 22 as well as the longitudinal slots 32 in the hood bracket 12. The clamping member 22 is then mated with the chassis bracket 17 (with the dampening pad 40 disposed therebetween, if desired) by engaging the bottom surface of the inward retainer portion 26 with the adjustment assembly mounting portion 20 of the chassis bracket 17. The bolts 34 are received within the openings 36 in the chassis bracket 17, and the nuts 38 are thereafter threaded onto the bolts 34 to secure the clamping member 22, the hood bracket 12, and the chassis bracket 17 together.

To at least temporarily fix the position of the hood bracket 12 and hood H with respect to the chassis C, the nut is tightened on the bolt 34 until the head of the bolt applies a force on the outward retainer portion 24. As a result, the clamping member 22 applies a clamping force on the adjustment portion 16 of the hood bracket 12 to secure the hood bracket 12 within the clamping member 22, thereby securing the hood bracket 12 to the chassis bracket 17.

Figure 4:
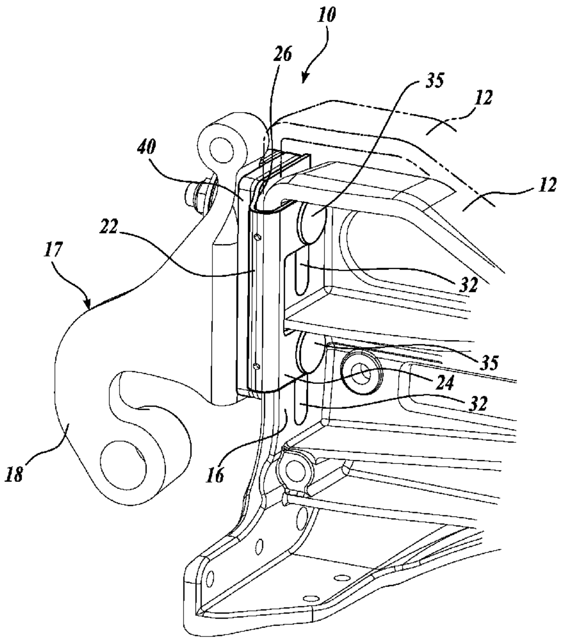
FIG. 4 is an isometric view of the adjustment assembly of FIG. 1, wherein the first structural member is shown in a second position.

Referring to FIG. 4, the position of the hood H may need to be adjusted after securing it to the vehicle V. To adjust the position of the hood bracket 12, and thus the hood H, the nut 38 is loosened on the bolt 34 such that the head of the bolt no longer exerts a substantial force on the outward retaining portion 24. With the nut 38 loosened, the outward retainer portion 24 springs outwardly to at least partially release the clamping grip on the adjustment portion 16 of the hood bracket 12. With the adjustment portion 16 of the hood bracket 12 loosely received within the clamping member 22, the hood bracket 12 can slide within the clamping member 22. It should be appreciated that the nut 38 need only be loosened to sufficiently reduce the clamping force on the hood bracket 12 such that the hood bracket 12 is moveable within the clamping member 22. It may be desired to loosen the nut 38 such that the hood bracket 12 moves only when a sufficient force is exerted on the hood H by an operator or machine, in addition to the gravitational effects on the hood H. In this manner, when an operator or machine repositions the hood, the hood is at least temporarily secured in this second position while the operator tightens the nuts 38.

The movement path of the hood bracket 12 within the clamping member 22 is defined by the longitudinal slots 32. The hood bracket 12 can move within the clamping member 22 until an edge of a longitudinal slot 32 engages the shaft of a bolt 34. Thus, the length of the longitudinal slots 32 can be varied to increase or decrease the adjustability of the hood H through the adjustment assembly 10. Moreover, the adjustment portion 16 may include additional longitudinal slots that intersect the existing longitudinal slots 32 such that the hood H can be adjusted in two or more directions. Moreover, the adjustment slots 32 may instead be formed in the clamping member 22 and the chassis bracket 17. As such, the hood bracket 12 and fasteners 34 would instead move together along the path defined by the longitudinal slots formed within the clamping member 22.

After the hood adjustments are made, the nuts 38 are tightened on the bolts 34 to secure the hood bracket 12 within the clamping member 22. In this manner, the hood H is secured to the vehicle V.

The adjustment assembly 10 provides the advantage of allowing a user to adjust the position of the hood H without disconnecting the hood H from the vehicle V. When the nuts 38 are sufficiently loosened on the bolts 34, the outward retainer portion 24 springs outwardly to at least partially release the clamping grip on the adjustment portion 16 of the hood bracket 12. As such, the hood bracket 12 is moveable within the clamping member 22, yet the hood bracket 12 remains secured to the chassis bracket 17 through the fasteners 34. Thus, only one person is required to adjust the position of the hood H, thereby reducing assembly time, repair costs, etc.

While illustrative embodiments have been illustrated and described, it will be appreciated that various changes can be made therein without departing from the spirit and scope of the present disclosure.

The invention claimed is:

1. An adjustment assembly for adjustably coupling a first structural member to a second structural member, the adjustment assembly comprising:

(a) a flexible clamping member having an outward retainer portion and an inward retainer portion, the flexible clamping member adapted to flexibly engage a portion of the first structural member such that the first structural member is disposed between the outward retainer portion and the inward retainer portion and the outward retainer portion is engageable with a first surface of the first structural member and the inward retainer portion is engageable with an opposite surface of the first structural member, the flexible clamping member further having at least a first opening formed in the outward retainer portion that substantially aligns at least a second opening formed in the inward retaining portion; and (b) at least one fastener assembly having a fastener adapted to pass through the at least first and second openings in the outward and inward retainer portions of the clamping member and the first and second structural members, wherein one of the first and second openings is shaped to receive a correspondingly shaped non-threaded portion of the fastener such that the non-threaded portion of the fastener is not rotatable within the opening, wherein a portion of the fastener assembly is moved into a first position to fixedly couple the first structural member to the second structural member, and wherein a portion of the fastener assembly is moved into a second position to adjustably couple the first structural member to the second structural member.

2. The adjustment assembly of claim 1, wherein the fastener assembly is a bolt and nut combination.

3. The adjustment assembly of claim 2, wherein the nut is tightened on the bolt to move the fastener into the first position, and wherein the nut is loosened on the bolt to move the fastener into a second position.

4. The adjustment assembly of claim 3, wherein the bolt includes a non-threaded polygonal-shaped neck portion that is received within the correspondingly-shaped one of the first and second openings in the clamping member such that the bolt does not rotate with regard to the clamping member.

5. The adjustment assembly of claim 1, wherein the fastener applies a force to the clamping member when the fastener is in the first position to fixedly secure the first structural member within the clamping member.

6. The adjustment assembly of claim 1, wherein first structural member is moveable within the clamping member when the fastener is in the second position.

7. The adjustment assembly of claim 1, wherein the fastener applies a force to the clamping member when the fastener is in the second position to slow the movement of the first structural member within the clamping member.

8. A hood adjustment assembly for adjustably coupling a hood to a vehicle chassis, the hood adjustment assembly comprising:

(a) a clamping member having an outward retainer portion and an inward retainer portion, wherein a hood portion is slidably receivable within the clamping member between the outward and inward retainer portions such that the outward retainer portion is configured to contact a first surface of the hood portion and the inward retainer portion is configured to contact an opposite surface of the hood portion, the clamping member further having at least a first opening formed in the outward retainer portion that substantially aligns at least a second opening formed in the inward retaining portion; and (b) at least one fastener assembly having a fastener adapted to pass through the at least first and second openings in the outward and inward retainer portions of the clamping member, the hood portion, and a chassis portion, wherein one of the first and second openings is shaped to receive a correspondingly shaped non-threaded portion of the fastener such that the non-threaded portion of the fastener is not rotatable within the opening, wherein a portion of the fastener assembly is moved into a first position to apply a force to the outward retainer portion to fixedly secure the hood portion between the outward retainer portion and the inward retainer portion, and wherein a portion of the fastener assembly is moved into a second position to reduce the force on the outward retainer portion and allow the hood portion to be moved between the outward retainer portion and the inward retainer portion.

9. The adjustment assembly of claim 8, wherein the hood portion includes at least one adjustment slot adapted to slidably receive the fastener.

10. The adjustment assembly of claim 9, wherein the movement of the hood portion is defined by the size and shape of the adjustment slot.

11. The adjustment assembly of claim 8, further comprising a first adjustment slot formed in the clamping member and a second adjustment slot formed in the chassis portion, wherein the first and second adjustment slots are adapted to slidably receive the fastener.

12. The adjustment assembly of claim 11, wherein the movement of the hood portion is defined by the size and shape of the first and second adjustment slots.

13. The adjustment assembly of claim 8, wherein the fastener assembly is a bolt and nut combination.

14. The adjustment assembly of claim 13, wherein the nut is tightened on the bolt to move the fastener into the first position, and wherein the nut is loosened on the bolt to move the fastener into a second position.

15. The adjustment assembly of claim 13, wherein the bolt includes a non-threaded polygonal-shaped neck portion that is received within the correspondingly-shaped one of the first and second openings in the clamping member such that the bolt does not rotate with regard to the clamping member.

* * * * *

UNITED STATES PATENT AND TRADEMARK OFFICE

CERTIFICATE OF CORRECTION

PATENT NO. : 7,900,729 B2
APPLICATION NO. : 11/752821
DATED : March 8, 2011
INVENTOR(S) : P. R. Smullen, Jr.

It is certified that error appears in the above-identified patent and that said Letters Patent is hereby corrected as shown below:

| **COLUMN** | **LINE** | **ERROR** |
|---|---|---|
| 5<br>(Claim 1, | 63<br>line 29) | "to the second structural member." should read --to the second structural member; wherein the first structural member is coupled to a vehicle hood and the second structural member is coupled to a vehicle chassis.-- |

Signed and Sealed this
Nineteenth Day of July, 2011

David J. Kappos
*Director of the United States Patent and Trademark Office*